United States Patent
Yunes et al.

(10) Patent No.: US 9,818,002 B1
(45) Date of Patent: Nov. 14, 2017

(54) NON-BINDING PLACEMENT OF INVENTORY IN A MATERIALS HANDLING FACILITY

(75) Inventors: Jeffrey Michael Yunes, Seattle, WA (US); Alexei A. Kudriavstev, Issaquah, WA (US); Xiao Yu Li, Seattle, WA (US); Long X. Nguyen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 651 days.

(21) Appl. No.: 12/397,890

(22) Filed: Mar. 4, 2009

(51) Int. Cl.
*G06G 1/14* (2006.01)

(52) U.S. Cl.
CPC ..................... *G06G 1/14* (2013.01)

(58) Field of Classification Search
None
See application file for complete search history.

(56) References Cited

U.S. PATENT DOCUMENTS

2010/0030667 A1* 2/2010 Chudy ............... G06F 19/3462
705/28

OTHER PUBLICATIONS

Reuven Cohen, Liran Katzir, and Danny Raz, "An Efficient Approximation for the Generalized Assignment Problem", Information Processing Letters, vol. 100, Issue 4, pp. 162-166, Nov. 2006.*
Reuven Cohen, Lairan Katzir, and Danny Raz, An Efficient Approximation for the Generalized Assignment Problem, Department of Computer Science, Technion, Haifa 32000, Israel.
Dawande, et al. "Approximation Algorithms for the Multiple Knapsack Problem with Assignment Restrictions", IBM Research Report, Mar. 1998.

* cited by examiner

*Primary Examiner* — Paul Danneman
(74) *Attorney, Agent, or Firm* — Thomas | Horstemeyer, LLP

(57) ABSTRACT

In various embodiments, approaches for the placement of inventory in a materials handling facility are described. A virtual representation of a plurality of storage locations in a materials handling facility is maintained in a computer system. Each one of a plurality of inventory items is assigned to a corresponding storage location in the virtual representation. A first portion of the inventory items is stocked, and a second portion of the inventory items is unstocked. Each of the assignments is associated with a profit value. An event related to a change in state of the materials handling facility is input into the computer system. Each one of the second portion of the inventory items is reassigned in the computer system to a corresponding storage location in the virtual representation.

27 Claims, 3 Drawing Sheets

NON-BINDING PLACEMENT OF INVENTORY IN A MATERIALS HANDLING FACILITY

BACKGROUND

In materials handling facilities, inventory is typically stored in various locations and is accessed when needed in order to fulfill orders for goods by customers. The state of a materials handling facility is constantly changing as items are stocked and as various inventory is depleted over time. It can be difficult in such a constantly changing environment to position inventory for optimal performance of the materials handling facility.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The system described herein relates to non-binding placement of inventory in a materials handling facility. Determining an optimal placement of inventory in a materials handling facility is a challenging problem as the state of the materials handling facility is dynamic and ever changing, with new inventory arriving, inventory being shipped to customers and/or other facilities, inventory being transferred to different areas of the materials handling facility, and the occurrence of other inventory movement activities. There is a cost or profit associated with the placement of inventory items in a materials handling facility depending on various factors, including maximizing use of the space associated with a storage location, reducing transit time for stocking the items or picking the items for shipment, arranging the items in a safe configuration for those employees handling the items, and other factors.

For example, a materials handling facility may have two bins, A and B. The highest profit location for a first arriving item X is bin A. However, item X may also fit in bin B, though with a lower profit. Assume item X is assigned to bin A when it arrives. Suppose item Y arrives after item X and is assigned to bin A before item X is stocked in bin A. Also assume item Y can fit in bin A, but not in bin B. Unless the assignment of item X is reevaluated in view of item Y, there may be no possible placement of item Y in bin A, which may be the optimum placement for item Y. As a consequence, competing placement of items results in greater cost to the operation of the materials handling facility and lower profit.

In order to avoid scenarios such as the foregoing and to determine optimal placements, the system described herein maintains a virtual representation of the storage locations in the materials handling facility. Upon movement of an inventory item within the materials handling facility, the system reassigns all of the unstocked items to available storage locations, where the assignments yield the highest overall profit or an acceptable approximation. In other words, the assignments of the unstocked items are tentative and not binding. In the following discussion, a general description of the system and its components is provided, followed by a discussion of the operation of the same.

Figure 1:
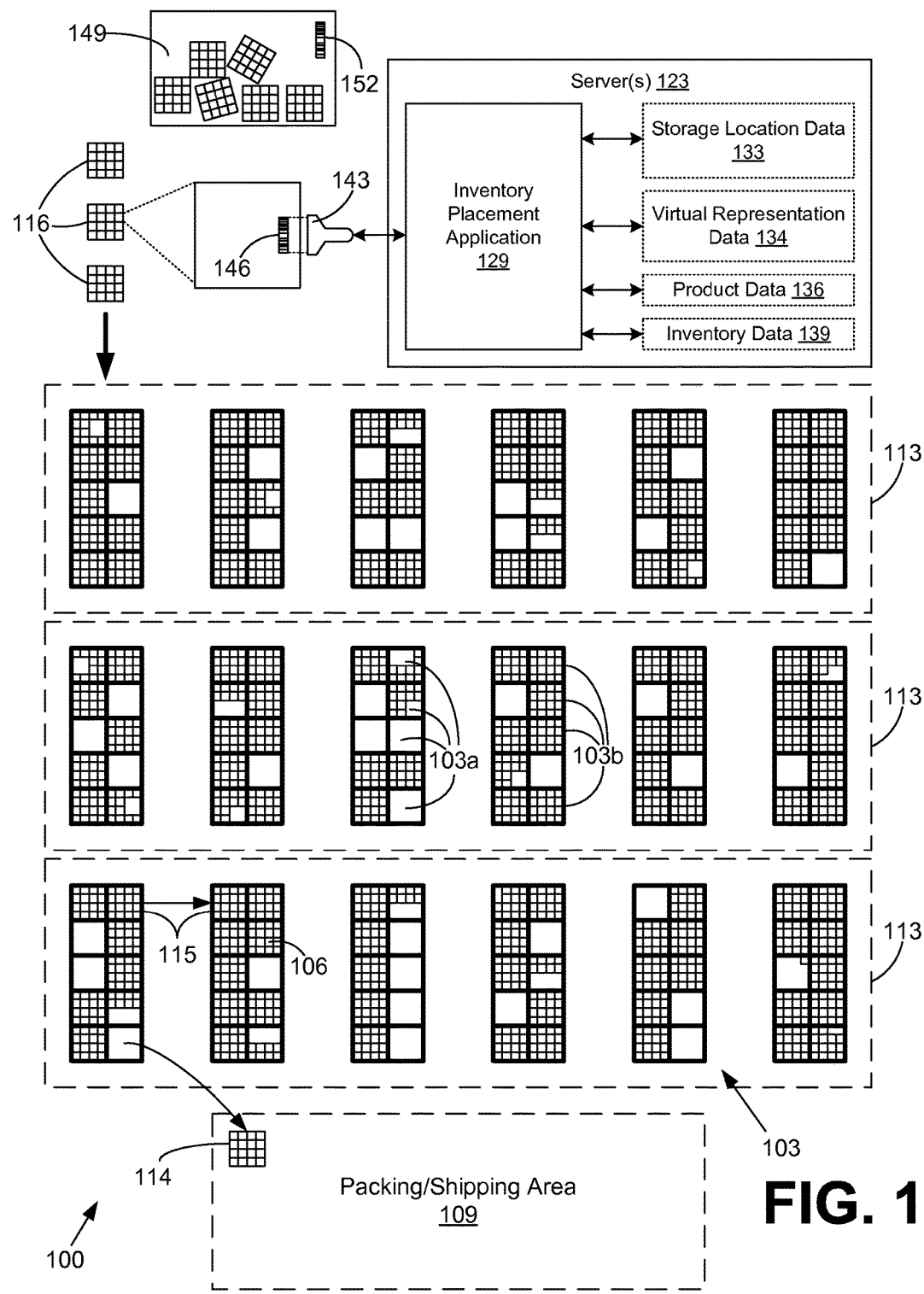
FIG. 1 is a drawing of a materials handling facility according to an embodiment of the present disclosure.

With reference to FIG. 1, shown is a drawing that depicts one example of a materials handling facility 100 according to an embodiment of the present disclosure. The materials handling facility 100 may include one or more of, but are not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the materials handling facility 100 is described herein with specific reference to a fulfillment center, it is understood that a materials handling facility 100 provides one example of many other types of environments to which the principles described herein apply.

According to the illustration provided herein, the materials handling facility 100 may comprise, for example, a large warehouse or other structure that includes a plurality of storage locations 103, such as bins, slots, shelves, containers, receptacles, crates, stalls, cribs, cordoned areas, or other locations, etc. Each of the storage locations 103 has a respective capacity. An inventory of items is stored in the storage locations 103. The storage locations 103 comprise both available storage locations 103a and unavailable storage locations 103b. An available storage location 103a is one that has available capacity such that it may be used to stock inbound or unstocked inventory.

Further, an available storage location 103a may contain stocked inventory items 106, thereby reducing available capacity. In some embodiments, there may be constraints on the number of different types of stocked inventory items 106 that are stored in a given storage location 103. Also, in some embodiments, a storage location 103 that currently has no available capacity may be deemed to be available for storage of new inventory, for example, if it is known that the remaining items in the storage location 103 will likely be removed before the new inventory is stocked therein. This may be known, for example, based on sales velocity of a given item stored in a storage location 103 or other information.

An unavailable storage location 103b is one that cannot be used to store new inbound inventory because inventory is currently stored there and the storage location 103 has no available capacity, the new inbound inventory would not be compatible with the inventory currently stored there, the space is being reallocated, and/or other reasons Stocked inventory items 106 may be stored in both available storage locations 130a and unavailable storage locations 103b in the materials handling facility 100.

In one embodiment, the materials handling facility 100 is configured to process orders for goods from customers. The inventory stored in the storage locations 103 is accessed to fulfill the orders from customers as might be the case, for example, where the materials handling facility 100 comprises a fulfillment center.

To this end, the materials handling facility 100 includes a packing/shipping area 109 where previously stocked inventory items 114 taken from the storage locations 103 are packed and shipped to various destination addresses. The storage locations 103 may be arranged into storage zones 113 that are defined based upon their distance from the packing/shipping area 109. Specifically, storage locations 103 in storage zones 113 that are closer to the packing/shipping area 109 are employed to store inventory that is processed through the materials handling facility 100 at a greater velocity. Storage locations 103 in storage zones 113 that are farther away from the packing/shipping area 109 are employed to store inventory that is processed through the materials handling facility 100 at a lesser velocity.

Where the materials handling facility 100 comprises a fulfillment center, agents, or "pickers," within the materials handling facility 100 perform the role of fulfilling orders for items purchased by customers. Specifically, agents perform the task of gathering, storing, or sorting items from storage locations 103 in the materials handling facility 100 to fulfill orders for goods that are shipped to the customers. Such previously stocked inventory items 114 may be sorted, packaged, and shipped in the packing/shipping area 109 or in other staging areas. Also, there may be a mass transfer 115 of stocked inventory items 106 from one storage location 103 to another within the materials handling facility 100.

The materials handling facility 100 receives unstocked inventory items 116 from various suppliers and manufacturers. The unstocked inventory items 116 may comprise, for example, products to be sold to customers or other items.

The materials handling facility 100 further comprises one or more servers 123 that are employed for various operational purposes. Specifically, the servers 123 may facilitate inventory control, pick orchestration, control of automated equipment, and other purposes. The servers 123 may comprise computer systems or other systems with like capability.

According to one embodiment, various applications are executed on the one or more servers 123 to facilitate placement of unstocked inventory items 116 in various storage locations 103. Among the applications executed in the one or more servers 123 is an inventory placement application 129. There may be many other applications executed in the one or more servers 123 beyond those specifically described herein, however a detailed explanation of such other applications is omitted herein.

In addition, various data is stored in memory that is accessible to the various applications executed in the one or more servers 123. Such data includes, for example, storage location data 133, virtual representation data 134, product data 136, and inventory data 139. The storage location data 133 provides information about each of the storage locations 103 in the materials handling facility 100 that is used in the placement of unstocked inventory items 116 as will be described. To this end, the storage location data 133 may comprise, for example, bin, pallet, other type, capacity, dimensions, etc. The virtual representation data 134 comprises information about virtual representations of the stocked inventory items 106 and unstocked inventory items 116 in the materials handling facility 100 including actual placements of stocked inventory items 106 and tentative placements of unstocked inventory items 116. The product data 136 comprises information about each of the products that make up the inventory in the materials handling facility 100. Specifically, the product data 136 may include information such as the name and type of product, the size and shape of products, weight of products, and other information. The inventory data 139 is used for inventory control in the materials handling facility 100 and includes the quantities of each inventory item as well as the storage location 103 where such items are stored. The inventory data 139 may be maintained or otherwise accessed by an appropriate inventory control system.

The materials handling facility 100 further comprises one or more input devices 143 that are employed to input product identifiers 146 from stocked or unstocked inventory items 106/116 into the servers 123 to be processed by the inventory placement application 129. Specifically, based upon a product identifier 146 input from an individual one of or a bundled or other grouping of stocked or unstocked inventory items 106/116 or some other event related to movement of inventory within the materials handling facility 100, the inventory placement application 129 determines where the unstocked inventory items 116 should be placed in the materials handling facility 100 as will be described. The product identifiers 146 may comprise, for example, a Universal Product Code (UPC), Global Trade Item Numbers (GTIN), European Article Number (EAN), International Standard Serial Number (ISSN), International Standard Book Number (ISBN), or other type of identifier. The input devices 143 may comprise, for example, a scanner, camera, keyboard, or other input device.

Additionally, the materials handling facility 100 may include mobile groupings 149 known by the system to contain identified quantities of stocked or unstocked inventory items 106/116. A mobile grouping 149 may comprise one or more stocked or unstocked inventory items 106/116 that are, for example, contained within a box, cart, tote, pallet, and/or any other container, or bound together with a wrapping and/or any other apparatus adapted to maintain a grouping of stocked or unstocked inventory items 106/116. A mobile grouping 149 may be used to transport and track multiple stocked or unstocked inventory items 106/116 more easily. Such mobile groupings 149 may be stored anywhere within the materials handling facility 100, including staging areas such as packing/shipping area 109, storage locations 103, or other areas, or may be in transit to the materials handling facility 100. Each mobile grouping 149 may have an identifier 152. The input devices 143 may be configured to read identifiers 152 from mobile groupings 149 or storage locations 103 known by the system to contain stocked or unstocked inventory items 106/116.

Next is a discussion of the operation of the materials handling facility 100 described above. The materials handling facility 100 is constantly changing over time as unstocked inventory items 116 are received and stocked in various storage locations 103, and as stocked inventory items 106 are removed from the respective storage locations 103 to fulfill orders from customers or other entities. Additionally, unstocked inventory items 116 and stocked inventory items 106 may be moved from one storage location 103 to another, or to or from one or more staging areas, such as packing/shipping area 109 or other areas. Due to this flow of inventory into, within, and out of the materials handling facility 100, the available capacities of the available storage locations 103a is constantly changing, and the state of the various storage locations 103 is constantly alternating between available and unavailable.

Thus, at any given moment, the available storage locations 103a into which unstocked inventory items 116 may be stored in the materials handling facility 100 change over time. According to various embodiments, when an event related to a movement of a stocked or unstocked inventory item 106/116 in the materials handling facility 100 is input into the system, a determination is made as to the available storage locations 103a that present the maximum profit for storage of the unstocked inventory items 116 in the materials handling facility 100.

Specifically, when stocked or unstocked inventory items 106/116 are moved within the materials handling facility 100, one or more product identifiers 146 may be input into the server 123. In this respect, such a product identifier 146 may comprise a UPC code or other type of code as described above that is scanned using an appropriate input device 143 and input into the server 123. Alternatively, product identifiers 146 may be input into the server 123 using some other appropriate input device 143 such as a keyboard, microphone, photo-imaging, or other device. A product identifier 146 may be positioned on a stocked or unstocked inventory item 106/116 itself, or on a box or carton that houses one or more stocked or unstocked inventory items 106/116. In this process, the total quantity of a given type of stocked or unstocked inventory items 106/116 may be determined.

Alternatively, the stocked or unstocked inventory items 106/116 may be determined by scanning an identifier 152 belonging to a mobile grouping 149 known by the inventory placement application 129 to hold the stocked or unstocked inventory items 106/116. Such a mobile grouping 149 may be a tote, cart, box, pallet, or some other type of container or apparatus for grouping used within the materials handling facility 100. The association between a particular stocked or unstocked inventory item 106/116 and the mobile grouping 149 may be stored in, for example, storage location data 133 or virtual representation data 134.

When a product identifier 146 is scanned, an event related to a movement of a stocked or unstocked inventory item 106/116 within the materials handling facility 100 is inputted into the inventory placement application 129. An unstocked inventory item 116 may be moved, for example, when it is received at the materials handling facility 100, when it is moved to a staging area such as packing/shipping area 109 or other area, when it is moved from one storage zone 113 to another storage zone 113, or when it is stocked in an available storage location 103a, etc. A stocked inventory item 106 may be moved, for example, when it is pulled from a storage location 103 to be shipped to a customer, when it is relocated from one storage location 103 to another storage location 103, when it is transferred from one storage zone 113 to another storage zone 113, etc.

In various embodiments, the unstocked inventory items 116 may comprise inventory items which are not yet within the materials handling facility 100. Such unstocked inventory items 116 may be, for example, in transit to the materials handling facility 100, on order to be delivered to the materials handling facility 100, in production, in temporary storage elsewhere, or may have some other status reflecting a location outside the materials handling facility 100. In such cases, an event may be generated by systems exterior to the materials handling facility 100 in data communication with the inventory placement application 129. For example, an event may be generated at a site where a shipment is being sent to the materials handling facility 100. Further, an event may be generated by manual data entry for input to the inventory placement application 129 and in other situations.

The inventory placement application 129 maintains a virtual representation of the storage locations 103 in the materials handling facility 100. The virtual representation may be included, for example, in virtual representation data 134. The virtual representation tracks the storage locations 103, including both available storage locations 103a and unavailable storage locations 103b, the unstocked inventory items 116, and the stocked inventory items 106. Though the virtual representation includes the assignments of stocked inventory items 106 to storage locations 103 according to actual physical placements, it also includes pending assignments of unstocked inventory items 116 to available storage locations 103a based on the maximum profit of the assignments overall.

The assignments of the virtual representation are used to direct stocking of the unstocked inventory items 116 into one or more available storage locations 103a. To illustrate, using an input device 143, an agent may scan the product identifier 146 of an unstocked inventory item 116 located in a staging area, for example, that is to be stocked or restocked in a materials handling facility 100. Calculation then occurs to determine a new configuration in the virtual representation. Based upon the virtual representation in the virtual representation data 134, the inventory placement application 129 may then communicate the assigned available storage location 103a for the unstocked inventory item 116 to the agent. The inventory placement application 129 is configured to render an output to personnel by way of a display screen, printer, or other output that identifies the available storage locations 103a to be used to store the unstocked inventory items 116.

The agent may then be directed to stock the unstocked inventory item 116 in the assigned storage location 103. In various embodiments, the unstocked inventory item 116 may be reclassified to a stocked inventory item 106, and the available capacity of the storage location 103 may be updated. In other embodiments, such reclassification and updating may occur only after confirmation that the unstocked inventory item 116 has been actually stocked in the storage location 103. The product identifier 146 of the unstocked inventory item 116 may be rescanned to inform the inventory placement application 129 that the unstocked inventory item 116 is being placed in the respective storage location 103. Alternatively, the event of stocking the unstocked inventory item 116 may be communicated to the inventory placement application 129 by some other method. In various embodiments, if the storage location 103 has no additional available capacity, the storage location 103 may be reclassified as an unavailable storage location 103b. Thus, the unstocked inventory item 116 may be assigned to multiple different storage locations 103 while waiting in one or more staging areas before it is actually transported to a storage location 103 and stocked.

Furthermore, multiple different unstocked inventory items 116 may be scanned before being stocked in the materials handling facility 100 contemporaneously with each other. In such case, stocking personnel may place multiple different unstocked inventory items 116 onto the same stocking cart before scanning the respective product identifiers 146 and ultimately heading out into the materials handling facility 100 to stock the unstocked inventory items 116.

When an event related to a change in state of the materials handling facility 100 is inputted into the inventory placement application 129, the assignments previously made of the unstocked inventory items 116 to available storage locations 103a may no longer represent a maximized or nearly maximized profit for the assignments overall. As a nonlimiting example, if a mass transfer 115 of previously stocked inventory items 114 frees up a previously unavailable storage location 103b, one or more unstocked inventory items 116 assigned to other available storage locations 103a in the virtual representation may have to be reassigned to the previously unavailable storage location 103b to achieve a maximum profit, or at least an increased profit relative to the previous assignments, across all assignments. As another nonlimiting example, if a new unstocked inventory item 116 arrives at the materials handling facility 100, it may be of such a size or configuration that it would fit in only one of the available storage locations 103a. Unstocked inventory items 116 currently assigned to the available storage locations 103 may need to be reassigned to other available storage locations 103a to achieve an increased profit across all assignments.

Therefore, in some embodiments, upon an event related to a change in state of the materials handling facility 100, all of the unstocked inventory items 116 may be reassigned to available storage locations 103a to represent an increased profit compared to the previous assignments across all assignments. Not all of the unstocked inventory items 116 need to be reassigned to different available storage locations 103a. Rather, an algorithm is executed to determine if the current assignments represent an increased profit for storage of the unstocked inventory items 116 in the available storage locations 103a. In some embodiments, the previous assignments of the virtual representations may be cached and not be recomputed upon every event within a predetermined time interval. In other embodiments, the assignments in the virtual representation may be recomputed upon every event. Whether or not the algorithm is executed upon every event may be an implementation choice based upon the running time of the algorithm.

Events related to a change in state of the materials handling facility 100 may be related, for example, to many different movements of stocked or unstocked inventory items 106/116. Examples of movements include, but are not limited to, receipt of an unstocked inventory item 116 at the materials handling facility 100, movement of an unstocked inventory item 116 to a staging area, movement of an unstocked inventory item 116 to a cart or tote, or placing of an unstocked inventory item 116 in a storage location 103. In some embodiments, the present locations of all unstocked inventory items 116 may be updated or reassessed upon processing an event. Locations may have changed if, for example, a stocker has moved within the materials handling facility 100. Such locations may be determined, for example, by Global Positioning System (GPS)-based tracking or some other method. In one embodiment, an event may be generated automatically by the inventory placement application 129 if it anticipates that the locations of products will have changed.

A further example includes movement of a stocked inventory item 116 out of a storage location 103 for shipping or transfer to another storage location 103, storage zone 113, or some other location. In some embodiments, an event may be related to ordering or movement of an unstocked inventory item 116 when it is not within the materials handling facility 100, such as, but not limited to, when the unstocked inventory item 116 has been ordered, is in transit, is at another facility and has been identified for shipment to the materials handling facility 100, etc. Additionally, events may be related to movement of mobile groupings 149 of multiple stocked or unstocked inventory items 106/116.

Events related to a change in state of a materials handling facility 100 may involve a change in the storage locations 103 of the materials handling facility 100. As a nonlimiting example, new storage locations 103 may be added. As another nonlimiting example, certain storage locations 103 may be moved to other locations or reclassified as unavailable for assignment of certain types of products. As another nonlimiting example, some storage locations 103 may be removed from the facility.

In some embodiments, events related to the change in state of a materials handling facility 100 may be non-inventory related, such as a change in time, a change from one work shift to another, a change in the number of employees working in an area of the materials handling facility 100, a change in the location of an employee within the materials handling facility 100, or other non-inventory-related changes in state. Such events may be important in triggering assignments of unstocked inventory items 116 as they may involve a change in the factors underlying a profit function. Therefore, assignments that were previously profitable may now be less so given the changes in the profit function.

Assignments to unstocked inventory items 116 to available storage locations 103a may be determined by several methods. One particular method involves modeling certain objects within the inventory placement application 129 in order to generate inputs to a maximization version of the generalized assignment problem. The problem may be described by the following: A pair (B, S) where B is a set of M bins (knapsacks) and S is a set of N items. Each bin $C_j$ in B has capacity c(j), and for each item i and bin $C_j$ we are given a size s(i, j) and a profit p(i, j). Find a subset U of S that has a feasible packing in B, such that the profit is maximized.

Regarding the subject matter of the present application, B may be the set of available storage locations 103a, S may be the set of unstocked inventory items 116, (B, S) may represent the assignments in the virtual representation, the capacity may depend on the available capacity of the respective available storage location 103a, and size and profit may be defined in a variety of ways depending on the materials handling facility 100.

This problem is considered NP-complete, so it is difficult to solve in a reasonable amount of time for large data sets. According to various embodiments, any one of multiple approaches may be used in determining solutions to the generalized assignment problem. One example involves a brute-force method of trying all possible assignments, which may be possible for some data sets given adequate resources on servers 123. Another example involves an approximation approach that reduces the computational complexity of the problem and produces a result that is an approximation to the solution, if not the actual solution. One particular example of such an approximation approach is described in a paper by Cohen et al., *An Efficient Approximation for the Generalized Assignment Problem*, Technion, Haifa, Israel, 2006 (hereinafter Cohen), which is incorporated herein by reference in its entirety as if it were fully produced herein and which is attached as an appendix hereto.

Cohen describes an approximation approach that has a time complexity of $O(M \cdot f(N) + M \cdot N)$, wherein N is the number of unstocked inventory items 116, M is the number of available storage locations 103a, and $O(f(N))$ is the time complexity of an approximation approach for solving the knapsack problem. The knapsack problem is a similar problem that determines which of the unstocked inventory items 116 can fit in one available storage location 103a so that the profit is maximized. The approach of Cohen guarantees a $(1+\alpha)$ approximation ratio, where $\alpha$ is the approximation ratio of an approach for solving the knapsack problem.

In various embodiments, in order to assign unstocked inventory items 116 to available storage locations 103a according to a solution to the generalized assignment problem, the inputs to the algorithm may be simplified or approximated. As a nonlimiting example, separate instances of the algorithm may be executed on the unstocked inventory items 116 and available storage locations 103a within, for example, one or more storage zones 113 instead of one instance with inputs encompassing the entire materials handling facility 100. Moreover, the inventory placement application 129 may execute additional preprocessing tasks, for example, to exclude available storage locations 103a that cannot receive additional unstocked inventory items 116 of a different type or kind, etc.

According to various embodiments, the inventory placement application 129 may be able to perform the reassignments for the virtual representation in real time given adequate computation resources. One benefit of using a real-time, or substantially real-time, approach is that it can calculate placements and produce a result for users of the system quickly. By returning a desirable inventory placement to an agent quickly, the agent is able to proceed to stock the unstocked inventory items 116 in one or more specified storage locations 103 without wasting time waiting for directions. Another benefit of using a real-time approach is that the assignments may be based on profit factors that frequently change, such as stocker travel time.

According to various embodiments, a profit function is employed that provides a profit value for each potential assignment calculated. An assignment having a maximized profit may also be thought of as the assignment having the lowest cost. The profit function used by the inventory placement application 129 may incorporate a plurality of profit factors. In some embodiments, certain profit factors may not be applicable based on the state of the materials handling facility 100 or the current location of an unstocked inventory item 116.

Each of the profit factors relates to the operation of the materials handling facility 100, the characteristics of the unstocked inventory items 116, and other aspects. The profit factors may be calculated with respect to individual unstocked inventory items 116, or the profit factors may be calculated based on multiple unstocked inventory items 116 to be stocked together. Where multiple unstocked inventory items 116 are stocked together, profit factors may be calculated for the group of unstocked inventory items 116 based on profit factors calculated for individual unstocked inventory items 116 by averaging, etc.

A first one of the profit factors may involve a "picking productivity." The picking productivity involves the profit or cost of picking stocked inventory items 106 out of a given storage location 103 to be packed and shipped in the packing/shipping area 109. Such activity may be deemed "pre-shipment activity." The picking productivity may be calculated based upon the nature of a given storage location 103, the nature of the stocked inventory item 106 to be picked, or other factors. For instance, the picking productivity may depend upon the distance between a given storage location 103 and the packing/shipping area 109, assuming that all picked previously stocked inventory items 114 are ultimately taken to the packing/shipping area 109 to be packed and shipped. This reflects the greater amount of transit time a picker may be in transit after picking a previously stocked inventory item 114 or a greater amount of time a previously stocked inventory item 114 spends on a conveyor, etc.

To this end, the picking productivity may depend upon the storage zone 113 within which a given storage location 103 is located. Further, where storage locations 103 comprise bins or shelves, then the picking productivity may further depend upon the height of the respective bin or shelf. For example, higher picking productivity is assigned for shelves that are easily accessible such as those that are waist high as opposed to those that are at or about shoulder level, or at ground level.

Also, picking productivity may further depend upon the nature of the stocked inventory item 106 picked. Specifically, where a stocked inventory item 106 is very large or bulky, it may require multiple pickers for proper handling as opposed to smaller items that can be picked by a single picker. Also, some stocked inventory items 106 may require the use of predefined picking procedures to prevent damage or injury. Such may be the case, for example, with heavy electronic equipment such as large screen televisions and the like.

Further, picking productivity may consider the number of different types of stocked inventory items 106 stored in a single storage location 103. Storing several different types of stocked inventory items 106 may require the picker to spend more time sorting through the contents of the storage location 103. Therefore, a greater number of different types of stocked inventory items 106 within a storage location 103 may be associated with a lower profit value.

Based upon the above described factors or other factors not described herein, a profit factor associated with the picking productivity for picking a stocked inventory item 106 from a given storage location 103 may be determined. By taking all of the above concepts into account, a number may be determined for the profit factor that represents the picking productivity that may be employed in the profit function.

Another profit factor that may be employed in the profit function is "space utilization." Space utilization refers to how well a given stocked or unstocked inventory item 106/116 fits within a given storage location 103. Specifically, if a stocked or unstocked inventory item 106/116 is of an awkward shape or size relative to the storage location 103, then there may be a limit to the number of a specific type of stocked inventory items 106 that can actually be stored in a given storage location 103. The profit factor for space utilization may be calculated depending upon how well a quantity of a given stocked or unstocked inventory item 106/116 employs the space associated with one or more storage locations 103. Where space utilization is poor such that a significant amount of empty space results, then this factor may be relatively low for such a storage location 103. Alternatively, where a given quantity of a stocked or unstocked inventory item 106/116 fits well within a storage location 103 and employs most of the space available, then the value of the profit factor for space utilization may be relatively high.

Another profit factor to consider in the profit function involves the global impact within the materials handling facility 100 by the placement of the unstocked inventory items 116 in the identified storage locations 103 for which the profit analysis is performed. Specifically, once a given quantity of a type of unstocked inventory items 116 is placed into one or more storage locations 103, it can displace other future anticipated unstocked inventory items 116 that it is known will be received that might have been placed in such storage locations 103. In some situations, it may be more desirable to place the inventory not yet received in such storage locations 103 rather than current unstocked inventory items 116.

Thus, to assess the global impact a given product may have on the profits associated with the placement of other inventory in the materials handling facility 100, a profit factor for the global impact of the placement of inbound inventory 103 may be calculated for a given storage configuration of one or more storage locations 103. This profit factor may be calculated based on products that it is known will be received by the materials handling facility 100 in the future based upon ordering information, sales forecasts, and other data stored in the product data 136.

The profit factor for the global impact may be set as a low value if placement of a given quantity of an unstocked inventory item 116 in a respective storage location 103 would adversely affect the placement of other unstocked inventory items 116 that have been received or that will be received in the future. Conversely, the same profit factor may be relatively high if the placement of the quantity of the unstocked inventory items 116 does not adversely affect the product placement of other unstocked inventory items 116 as described above.

Yet another profit factor that is taken into account in the profit function above is a "stocking productivity." The stocking productivity relates to the profit of stocking a quantity of one or more unstocked inventory items 116 into one or more storage locations 103 associated with a given storage configuration. This profit factor may be calculated based upon the distance that the respective unstocked inventory items 116 are transported within the materials handling facility 100 from a current location to the respective storage locations 103. Where multiple unstocked inventory items 116 are placed on the same stocking cart, for example, the stocking productivity may relate to the stocking of the multiple unstocked inventory items 116. Specifically, the stocking productivity may be calculated based upon the distances between respective storage locations 103 for a given storage configuration to be potentially used to store the multiple unstocked inventory items 116. This reflects the fact that if the multiple unstocked inventory items 116 are stocked in storage locations 103 that are relatively close to each other, then the profit factor for stocking productivity is increased due to the reduced transit time and lesser distance stocking personnel will have to traverse while stocking the unstocked inventory items 116.

Also, the profit factor for stocking productivity may also depend upon the profit of placing respective unstocked inventory items 116 into respective storage locations 103. To this end, the profit may vary depending upon the nature of the unstocked inventory items 116 (i.e., bulky or large products as opposed to small or easily handled products). In addition, there are other profits that may be associated with the stocking productivity.

Still another profit factor that is taken into account in the profit function may be the throughput of stocked and unstocked inventory items 106/116 through the materials handling facility 100. This relates to the turnaround rate through the materials handling facility 100 that exists for a given product stored in respective storage locations 103. The throughput may relate to the sales velocity of a given item and the location of a given storage location 103 within the materials handling facility 100. Specifically, the profit factor associated with storage locations 103 that are close to the packing/shipping area 109 for stocked and unstocked inventory items 106/116 with high throughput may be deemed relatively high. Conversely, the profit factor associated with storage locations 103 that are close to the packing/shipping area 109 for stocked and unstocked inventory items 106/116 with low throughput may be deemed relatively low. This reflects the fact that stocked and unstocked inventory items 106/116 with low throughput placed in storage locations 103 close to the packing/shipping area 109 may displace other future stocked and unstocked inventory items 106/116 that experience high throughput. Thus, it is desirable to place unstocked inventory items 116 with a high sales velocity closer to the packing/shipping area 109 to minimize picker traffic and other factors within the materials handling facility 100.

Based on the foregoing discussion, values for each relevant profit factor may be identified. Although specific profit factors are described above, it is understood that other profit factors may be taken into account in the profit function. In some cases, the profit factors may be calculated specifically based upon profit or cost information about the operation of the materials handling facility 100, product information, sales forecasts, inventory information, and other information. Alternatively, it may be the case that the profit factors are determined based upon experience of running the materials handling facility 100 over time. In addition, the profit factors may be determined using predefined equations or formulas that take into account the various factors described above.

Weighting coefficients may be employed to weight the respective factors relative to each other in the profit function. Weighting coefficients may be determined based upon experience running the materials handling facility 100 over time. For example, weighting coefficients may be determined depending upon the time of year based upon experience within the materials handling facility 100. For example, in the springtime, throughput, global impact, stocking productivity, and space utilization may be weighted more heavily than picking productivity where slower sales periods are experienced. Alternatively, during the holiday shopping season, it may be the case that picker productivity is weighted heavier than most other factors given the fact that significant numbers of temporary employees may be hired for the shopping season to perform the picking function. Weighting coefficients may be specified using an automated system that is configured to adjust the weighting coefficients over time.

In addition, there may be various constraints placed upon the use of storage locations 103 for specific types of unstocked inventory items 116. Such constraints may be considered as profit factors in the profit function or may be applied, for example, as a preprocessing task. For example, the available storage locations 103 that can be used for the storage of some unstocked inventory items 116 may be limited due to unusual shapes or sizes of the unstocked inventory items 116, safety concerns, or other reasons. Also, unstocked inventory items 116 comprising various hazardous materials may be restricted to storage in certain storage locations 103 suitable for the storage of such materials.

Also, some storage locations 103 may be disqualified for use in storing certain unstocked inventory items 116 given that similar inventory is already stored adjacent to or near such storage locations 103. This relates, for example, to quality control in a fulfillment center. Specifically, if unstocked inventory items 116 include 200 hammers manufactured by a first manufacturer, it might be unwise to position such unstocked inventory items 116 in a storage location 103 adjacent to a storage location 103 that holds hammers manufactured by a second manufacturer. This is because confusion may result and pickers might pick the wrong item due to the close proximity of the respective stocked inventory items 106. Further, there may be safety constraints that limit the use of given storage locations 103 for different types of inventory.

The constraints may comprise soft constraints or hard constraints. A soft constraint is one that is aspired to in which attempts are made to follow the constraint if possible.

Alternatively, a constraint may be a hard constraint that must be followed in placing unstocked inventory items 116 into respective storage locations 103, or by avoiding placing certain unstocked inventory items 116 in certain storage locations 103. In some embodiments, it may be desirable to avoid hard constraints as hard constraints may interfere with determining optimal assignments.

Figure 2:
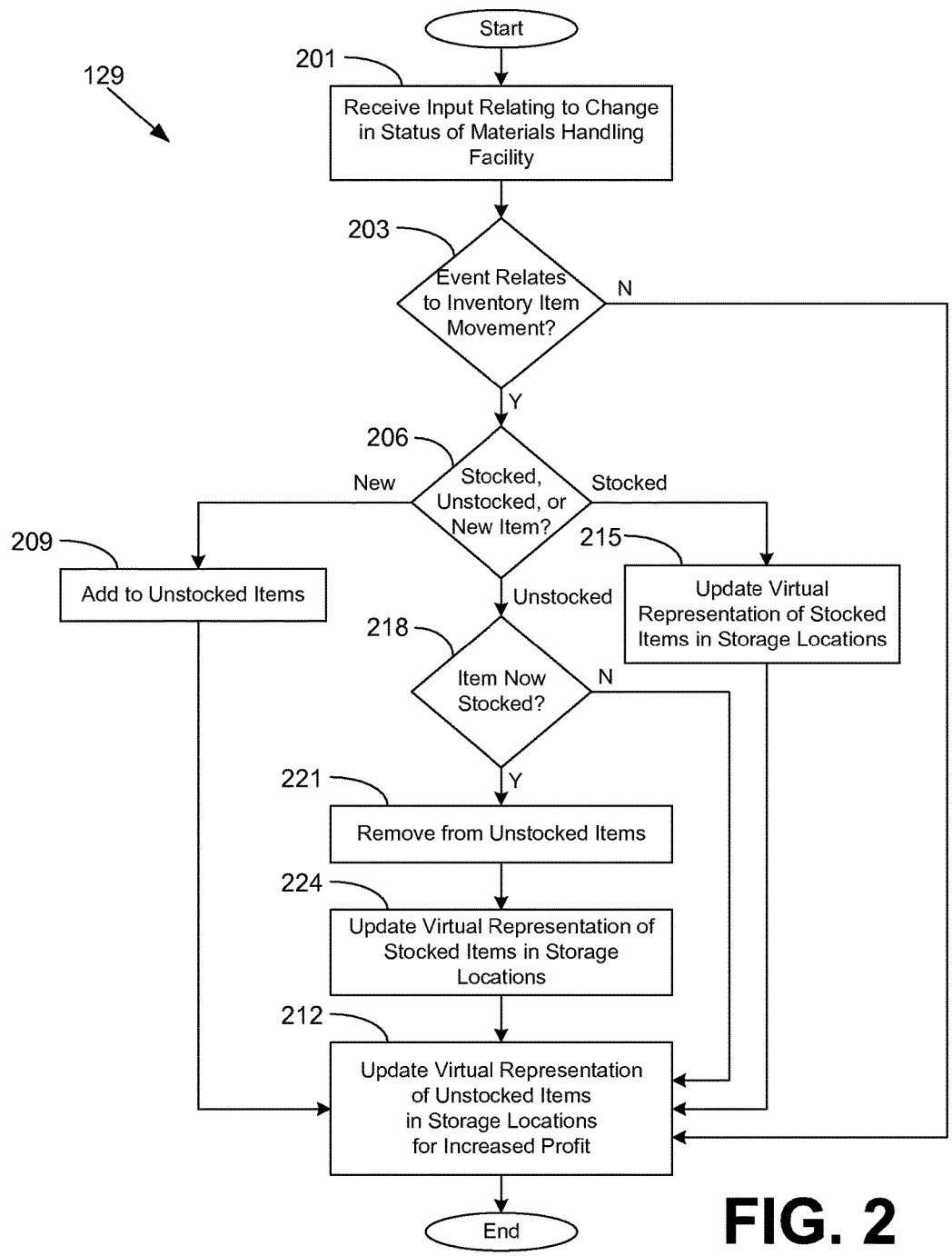
FIG. 2 is a drawing of a flowchart that illustrates one example of the operation of an inventory placement application implemented in the materials handling facility of FIG. 1 according to an embodiment of the present disclosure.

Referring next to FIG. 2, shown is a flowchart that provides one example of the operation of the inventory placement application 129 (FIG. 1) according to an embodiment of the present disclosure. Alternatively, the flowchart of FIG. 2 may be viewed as depicting steps of an example method implemented in the server(s) 123 (FIG. 1) to determine a storage configuration of one or more storage locations 103 (FIG. 1) for the storage of unstocked inventory items 116 (FIG. 1). The inventory placement application 129 acts upon an event related to a change in status of the materials handling facility 100 (FIG. 1) which is input to the server 123 as described above. It is understood that, in some embodiments, the inventory placement application 129 may execute indefinitely on the server 123 and that the following flowchart may represent a portion of the logic comprising the inventory placement application 129 that is repeated to handle an event.

To begin, in box 201, the inventory placement application 129 receives input of an event relating to a change in status of the materials handling facility 100. In box 203, the inventory placement application 129 determines whether the event relates to movement of an inventory item. The movement may involve, for example, receipt of unstocked inventory items 116 (FIG. 1) at the materials handling facility 100, arrival at a staging area, transfer of stocked inventory items 106 (FIG. 1) between storage locations 103 in the same or different storage zones 113 (FIG. 1), stocking of unstocked inventory items 116 in one or more storage locations 103, removal of stocked inventory items 106 from one or more storage locations 103 for packing and shipment, and other possible movements. The event may have been generated by, for example, the scanning by an input device 143 (FIG. 1) of a product identifier 146 (FIG. 1), an identifier 152 (FIG. 1) on a mobile grouping 149 (FIG. 1), an update of a GPS-determined location, or some other notification process.

If the inventory placement application 129 determines in box 203 that the event relates to inventory item movement, then the inventory placement application 129 determines the type of stocked or unstocked inventory item 106/116 in box 206. That is, whether the stocked or unstocked inventory item 106/116 is a newly received unstocked inventory item 116, an unstocked inventory item 116, or a stocked inventory item 106. A unstocked inventory item 116 may be considered newly received by the inventory placement application 129 if it is ordered for the materials handling facility 100, expected to be ordered for the materials handling facility 100, in transit to the materials handling facility 100, actually received at the materials handling facility 100, or has some other status.

If the unstocked inventory item 116 is newly received, the newly received unstocked inventory item 116 may be added to the unstocked inventory items 116 in box 209. Then, in box 212, because the unstocked inventory items 116 have changed, the virtual representation of the unstocked inventory items 116 in the storage locations 103 is updated for an increased profit associated with the assignments. This task may involve, for example, the inventory placement application 129 using an approach to calculate desirable assignments quickly for the virtual representation. The unstocked inventory item 116 is thus tentatively assigned to a storage location 103 in the virtual representation, and the inventory placement application 129 ends.

If, instead, the inventory placement application 129 determines that the stocked or unstocked inventory item 106/116 is a stocked inventory item 106 in box 215, the inventory placement application 129 next moves to box 215 and updates the virtual representation of the stocked inventory items 106 in the storage locations 103. In this case, the stocked inventory item 106 may have been removed from stock, for example, in order to be shipped out to a customer, to be transferred to another storage location 103 or storage zone 113, etc. Therefore, the actual contents of at least one storage location 103 have changed. In some cases, a stocked inventory item 106 that has been moved from its previous storage location 103 may be considered an unstocked inventory item 116 in need of a new assignment, Accordingly, in box 212, the inventory placement application 129 updates the virtual representation of unstocked inventory items 116 for an increased profit associated with the assignments. This task may involve, for example, the inventory placement application 129 using an approach to calculate desirable assignments for the virtual representation quickly. The inventory placement application 129 then ends.

If, instead, the inventory placement application 129 determines that the stocked or unstocked inventory item 106/116 is an unstocked inventory item 116 in box 206, the inventory placement application 129 next moves to box 218 and determines whether, as a result of inventory item movement, the unstocked inventory item 116 is now a stocked inventory item 106. If the unstocked inventory item 116 is now a stocked inventory item 106, the inventory placement application 129 removes the unstocked inventory item 116 from the unstocked inventory items 116 in box 221. Because the unstocked inventory item 116 is now stocked, the inventory placement application 129 next moves to box 224 and updates the virtual representation of the stocked inventory items 106 in the storage locations 103. Then, in box 212, the inventory placement application 129 updates the virtual representation of unstocked inventory items 116 for an increased profit associated with the assignments. This task may involve, for example, the inventory placement application 129 using an approach to calculate desirable assignments for the virtual representation quickly. The inventory placement application 129 then ends.

In box 218, the inventory placement application 129 may instead determine that the stocked or unstocked inventory item 106/116 is still an unstocked inventory item 116. In such a case, the inventory item movement of box 203 may be, for example, an initiating of a transfer of the unstocked inventory item 116 from one staging area to another, a completion of a transfer of the unstocked inventory item 116 from one staging area to another, a movement of the unstocked inventory item 116 from an outer container to another container, etc. Thereafter, in box 212, the inventory placement application 129 updates the virtual representation of unstocked inventory items 116 for an increased profit associated with the assignments. This task may involve, for example, the inventory placement application 129 using an approach to calculate desirable assignments for the virtual representation quickly. The inventory placement application 129 then ends.

The inventory placement application 129, in box 203, may instead determine that the event does not relate to an inventory item movement. In such a case, the event may relate to a change in time, movement of employees, movement of bins, or other non-inventory-related changes to the status of the materials handling facility 100. If the event does not relate to an inventory item movement, the inventory placement application proceeds to box 212 and updates the virtual representation of unstocked inventory items 116 for an increased profit associated with the assignments. This task may involve, for example, the inventory placement application 129 using an approach to calculate desirable assignments for the virtual representation in real time or substantially real time. The inventory placement application 129 then ends.

Figure 3:
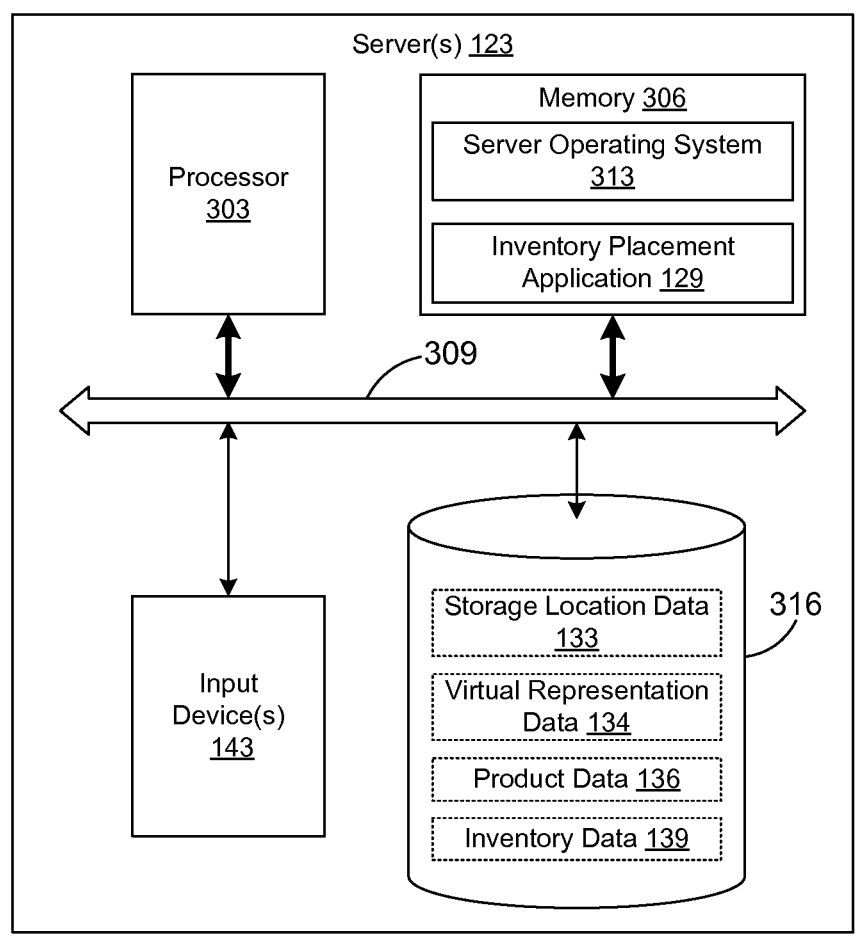
FIG. 3 is a drawing of a server used to implement the inventory placement application of FIG. 2 according to an embodiment of the present disclosure.

Referring next to FIG. 3, shown is an example of one embodiment of the one or more servers 123 according to various embodiments. The server 123 may include a processor circuit having a processor 303 and a memory 306, both of which are coupled to a local interface 309. The local interface 309 may comprise, for example, a data bus with an accompanying control/address bus. To this end, each server 123 may comprise, for example, a computer system or other system with like capability. Such computer systems may be configured to optimally perform as servers 123.

Various components may be stored in the memory 306 and are executable by the processor 303 including, for example, a server operating system 313 and the inventory placement application 129. In addition, other applications may be stored in the memory 306 and executable by the processor 303. The storage location data 133, virtual representation data 134, product data 136, and inventory data 139 may be stored in a data store 316 that is accessible by the processor circuit of the server 123 so as to access the various data stored therein. Alternatively, the data store 316 may be stored in locations other than within the server 123.

One or more input devices 143 (FIG. 1), such as an optical scanner, radiofrequency identifier scanner, or other scanner, are in data communication with the processor 303 either by way of the local interface 309 or through a network interface. Other examples of input devices 143 include a keyboard, keypad, touch pad, touch screen, microphone, mouse, joystick, or one or more push buttons, etc.

The server operating system 313 and the inventory placement application 129 are described as stored in the memory 306 and executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, or source code that may be expressed in proper format such as object code that is capable of being loaded into a of random access portion of the memory 306 and executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 303 may represent multiple processors and the memory 306 may represent multiple memories that operate in parallel. In such a case, the local interface 309 may be an appropriate network that facilitates communication between any two of the multiple processors 303, between any processor 303 and any one of the memories 306, or between any two of the memories 306, etc.

The functionality of the inventory placement application 129 as depicted by the example flowchart of FIG. 2 may be implemented, for example, in an object oriented design or in some other programming architecture. Assuming the functionality is implemented in an object oriented design, then each block represents functionality that may be implemented in one or more methods that are encapsulated in one or more objects. The inventory placement application 129 may be implemented using any one of or a combination of a number of programming languages such as, for example, C, C++, C#, Visual Basic, VBScript, Java, JavaScript, Perl, Ruby, Python, Flash, or other programming languages.

With reference to FIGS. 1-3, although the inventory placement application 129 is described as being embodied in software or code executed by general purpose hardware above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of the inventory placement application 129. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the inventory placement application 129 comprises software or code, it can be embodied in any computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the inventory placement application 129 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    receiving, by at least one computing device, a first event relating to an arrival of a first product to a fulfillment center, the first event generated based at least in part on scanning a first product identifier on the first product using at least one of: an optical scanner or a radiofrequency identifier scanner;
    determining, by the at least one computing device, respective capacities of individual ones of a plurality of product storage locations in the fulfillment center;
    in response to the first event, executing, by the at least one computing device, an approximation algorithm for solving the generalized assignment problem to determine a first set of optimal assignments of an inventory of products including the first product to the plurality of product storage locations in the fulfillment center, wherein determining the first set of optimal assignments comprises:
        maximizing a profit in assigning the inventory of products to the plurality of product storage locations based at least in part on at least one of: a space utilization factor, a picking productivity factor, a global impact factor relative to displacing anticipated unstocked inventory, a stocking productivity factor, or a safety factor;
    updating, by the at least one computing device, a data representation of the plurality of product storage locations in the fulfillment center to virtually assign the first product to a first product storage location in the fulfillment center according to the first set of optimal assignments;
    receiving, by the at least one computing device, a second event relating to an arrival of a second product to the fulfillment center, the second event generated based at least in part on scanning a second product identifier on the second product using at least one of: the optical scanner or the radiofrequency identifier scanner;
    in response to the second event, executing, by the at least one computing device, the approximation algorithm for solving the generalized assignment problem to determine a second set of optimal assignments of the inventory of products including the first product and the second product to the plurality of product storage locations in the fulfillment center, wherein determining the second set of optimal assignments comprises:
        maximizing the profit in assigning the inventory of products to the plurality of product storage locations based at least in part on at least one of: the space utilization factor, the picking productivity factor, the global impact factor relative to displacing anticipated unstocked inventory, the stocking productivity factor, or the safety factor;
    before the first product is physically stored in the first product storage location, updating, by the at least one computing device, the data representation to virtually reassign the first product from the first product storage location to a second product storage location in the fulfillment center according to the second set of optimal assignments; and
    causing, by the at least one computing device, the first product to be physically stored in the second product storage location.

2. The method of claim 1, further comprising updating, by the at least one computing device, the data representation to virtually assign the second product to the first product storage location in response to the second event.

3. The method of claim 2, further comprising receiving, by the at least one computing device, a confirmation that the second product has been physically stored in the first product storage location after the second product has been virtually assigned to the first product storage location.

4. The method of claim 1, further comprising receiving, by the at least one computing device, a confirmation that the first product has been physically stored in the second product storage location after the first product has been virtually reassigned to the second product storage location.

5. The method of claim 1, wherein the data representation is updated to virtually assign the first product to the first product storage location in the fulfillment center further in response to determining that an assignment of the first product to the first product storage location is associated with a maximum profit value in view of the first event.

6. The method of claim 1, wherein the data representation is updated to virtually reassign the first product to the second product storage location in the fulfillment center further in response to determining that an assignment of the first product to the second product storage location is associated with a maximum profit value in view of the second event.

7. A system, comprising:
- a data store that stores a data representation of a plurality of item storage locations in a materials handling facility; and
- at least one computing device in communication with the data store, the at least one computing device being configured to perform a method comprising:
  - receiving, by the at least one computing device, a first event relating to a movement of a first item en route to or in the materials handling facility, the first event generated based at least in part on scanning a first item identifier on the first item;
  - determining, by the at least one computing device, respective capacities of individual ones of a plurality of item storage locations in the materials handling facility;
  - in response to the first event, executing, by the at least one computing device, an approximation algorithm for solving the generalized assignment problem to determine a first set of optimal assignments of an inventory of items including the first item to the plurality of item storage locations in the materials handling facility, wherein determining the first set of optimal assignments further comprises:
    - maximizing a profit in assigning the inventory of items to the plurality of item storage locations;
  - updating, by the at least one computing device, the data representation to virtually assign the first item to a first item storage location in the materials handling facility according to the first set of optimal assignments;
  - receiving, by the at least one computing device, a second event relating to a movement of a second item en route to or in the materials handling facility, the second event generated based at least in part on scanning a second item identifier on the second item;
  - in response to the second event, executing, by the at least one computing device, the approximation algorithm for solving the generalized assignment problem to determine a second set of optimal assignments of the inventory of items including the first item and the second item to the plurality of item storage locations in the materials handling facility, wherein determining the second set of optimal assignments further comprises:
    - maximizing the profit in assigning the inventory of items to the plurality of item storage locations;
  - before the first item is physically stored in the first item storage location, updating, by the at least one computing device, the data representation to virtually reassign the first item from the first item storage location to a second item storage location in the materials handling facility according to the second set of optimal assignments; and
  - causing, by the at least one computing device, the first item to be physically stored in the second item storage location.

8. The system of claim 7, wherein the at least one computing device is configured to perform the method further comprising determining, by the at least one computing device, that an assignment of the first item to the first item storage location is associated with a maximum profit value in view of the first event.

9. The system of claim 8, wherein the at least one computing device is configured to perform the method further comprising determining, by the at least one computing device, that an assignment of the first item to the second item storage location is associated with a new maximum profit value in view of the second event.

10. The system of claim 8, wherein the maximum profit value is determined using a profit function comprising a plurality of profit factors.

11. The system of claim 10, wherein the plurality of profit factors includes a space utilization factor.

12. The system of claim 10, wherein the plurality of profit factors includes a picking productivity factor.

13. The system of claim 10, wherein the plurality of profit factors includes a global impact factor relative to displacing anticipated unstocked inventory in the materials handling facility.

14. The system of claim 10, wherein the plurality of profit factors includes a stocking productivity factor.

15. The system of claim 10, wherein the at least one computing device is configured to perform the method further comprising determining, by the at least one computing device, a weighting coefficient for at least one of the plurality of profit factors based at least in part on a current time of year.

16. The system of claim 7, wherein at least one of the movement of the first item or the movement of the second item corresponds to an arrival at a processing area of the materials handling facility.

17. The system of claim 7, wherein at least one of the movement of the first item or the movement of the second item corresponds to a transit movement to the materials handling facility.

18. The system of claim 7, wherein the first item is physically external to the materials handling facility when the data representation is updated in response to the first event and in response to the second event.

19. A method, comprising:
- receiving, by at least one computing device, an event relating to a first item en route to or in a materials handling facility, the event being generated based at least in part on scanning an item identifier on the first item;
- determining, by the at least one computing device, respective capacities of individual ones of a plurality of item storage locations in the materials handling facility;
- updating, by the at least one computing device, a data representation of the plurality of item storage locations in the materials handling facility to virtually assign the first item to a first item storage location in the materials handling facility in response to the event, wherein assigning the first item to the first item storage location further comprises:
  - maximizing a profit in assigning items to the plurality of item storage locations;
- after virtually assigning the first item to the first item storage location, determining, by the at least one computing device, that storage of a second item in the first item storage location would result in an increased profit over storage of the first item in the first item storage location;
- before the first item is physically stored in the first item storage location, updating, by the at least one computing device, the data representation to virtually reassign the first item from the first item storage location to a second item storage location in the materials handling facility, wherein reassigning the first item to the second item storage location further comprises:

maximizing the profit in assigning the items to the plurality of item storage locations; and causing, by the at least one computing device, the first item to be physically stored in the second item storage location.

20. The method of claim 19, further comprising receiving, by the at least one computing device, an indication that the first item has been physically stored in the second item storage location.

21. The method of claim 19, further comprising determining, by the at least one computing device, the increased profit according to a weighted combination of a plurality of profit factors.

22. The method of claim 19, wherein the increased profit is caused by a change in state of the materials handling facility that is non-inventory related.

23. The method of claim 19, wherein both the first item and the second item individually fit in the first item storage location, but a placement of the second item in the first item storage location results in less empty space in the first item storage location than a placement of the first item in the first item storage location.

24. The method of claim 19, further comprising determining, by the at least one computing device, the increased profit based at least in part on the second item having a greater sales velocity than the first item.

25. The method of claim 19, further comprising determining, by the at least one computing device, the increased profit based at least in part on the second item having a lower transit time within the materials handling facility than the first item.

26. The method of claim 19, further comprising:

causing, by the at least one computing device, an instruction to store the second item in the first item storage location to be rendered on a display.

27. The method of claim 19, wherein causing the first item to be physically stored in the second item storage location further comprises causing, by the at least one computing device, an instruction to physically store the first item in the second item storage location to be rendered on a display.

* * * * *